United States Patent
Strain et al.

(10) Patent No.: US 10,786,766 B2
(45) Date of Patent: Sep. 29, 2020

(54) SUPPORT STRUCTURE FOR FLUID TREATMENT SYSTEMS HAVING BELTED FILTRATION SYSTEMS

(71) Applicant: Nexom (US), Inc., Grafton, WI (US)

(72) Inventors: Cornelius J. Strain, Post Falls, ID (US); Kyle Jennings, Liberty Lake, WA (US)

(73) Assignee: NEXOM (US), INC., Grafton, WI (US)

( * ) Notice: Subject to any disclaimer, the term of this patent is extended or adjusted under 35 U.S.C. 154(b) by 0 days.

(21) Appl. No.: 15/312,938

(22) PCT Filed: May 20, 2015

(86) PCT No.: PCT/US2015/031854
§ 371 (c)(1),
(2) Date: Nov. 21, 2016

(87) PCT Pub. No.: WO2015/179576
PCT Pub. Date: Nov. 26, 2015

(65) Prior Publication Data
US 2017/0189836 A1    Jul. 6, 2017

Related U.S. Application Data

(60) Provisional application No. 62/001,481, filed on May 21, 2014.

(51) Int. Cl.
*B01D 33/80* (2006.01)
*B01D 33/52* (2006.01)
(Continued)

(52) U.S. Cl.
CPC .......... *B01D 33/80* (2013.01); *B01D 29/096* (2013.01); *B01D 33/04* (2013.01); *B01D 33/056* (2013.01);
(Continued)

(58) Field of Classification Search
CPC ...................... B01D 2201/0415; B01D 33/04; B01D 33/52; B01D 33/76; B01D 33/80; C02F 1/001
See application file for complete search history.

(56) References Cited

U.S. PATENT DOCUMENTS 3,531,404 A    9/1970  Brian et al.
3,836,681 A    9/1974  Dodd J
(Continued)

FOREIGN PATENT DOCUMENTS

DE    2723862 A1    12/1977
DE    7716727 U1    10/1979
(Continued)

OTHER PUBLICATIONS

Chinese Patent Application No. 2013-80046521, Office Action and Search Report dated Jul. 6, 2012, with English Translation.
(Continued)

*Primary Examiner* — Dirk R Bass
(74) *Attorney, Agent, or Firm* — Leber IP Law; Celia H. Leber

(57) ABSTRACT

The present technology is directed generally to fluid treatment systems. In particular, several embodiments are directed toward filter supports configured to be positioned adjacent a filter belt within a filter belt filtration system. In one embodiment, the filter support can have a longitudinal axis generally parallel to the direction of movement of the filter belt. The filter support can include a plurality of struts spaced apart by a plurality of openings, and at least one of the plurality of struts extends across a portion of the filter support such that a longitudinal axis of the at least one strut is positioned at an angle with respect to the longitudinal axis of the filter support.

5 Claims, 8 Drawing Sheets

(51) Int. Cl.
- *B01D 33/76* (2006.01)
- *B01D 33/04* (2006.01)
- *C02F 1/00* (2006.01)
- *B01D 29/09* (2006.01)
- *B01D 33/056* (2006.01)

(52) U.S. Cl.
CPC ............ *B01D 33/52* (2013.01); *B01D 33/76* (2013.01); *C02F 1/001* (2013.01); *B01D 2201/0415* (2013.01); *B01D 2201/0423* (2013.01)

(56) References Cited

U.S. PATENT DOCUMENTS

| | | | |
|---|---|---|---|
| 3,864,255 A | | 2/1975 | Swanson |
| 3,941,701 A | * | 3/1976 | Stahl .................... B01D 33/042 210/386 |
| 4,830,750 A | | 5/1989 | Jandourek et al. |
| 5,456,832 A | | 10/1995 | Louden et al. |
| 5,462,677 A | | 10/1995 | Benesi |
| 5,961,847 A | | 10/1999 | Creps et al. |
| 6,511,597 B2 | | 1/2003 | Hori et al. |
| 6,571,959 B1 | | 6/2003 | Moore et al. |
| 8,302,780 B1 | | 11/2012 | Mitchell et al. |
| 2004/0005975 A1 | | 1/2004 | Garthaffner et al. |
| 2009/0200248 A1 | | 8/2009 | Van |
| 2009/0314721 A1 | | 12/2009 | Wood et al. |
| 2011/0089122 A1 | | 4/2011 | Smith |
| 2014/0083295 A1 | | 3/2014 | Jackson |

FOREIGN PATENT DOCUMENTS

| | | |
|---|---|---|
| DE | 19802179 A1 | 10/1999 |
| JP | S50-151478 U | 12/1975 |
| JP | S53111653 A | 9/1978 |
| JP | S54-009424 B | 4/1979 |
| JP | S54-033334 Y | 10/1979 |
| JP | H07-108115 A | 4/1995 |
| JP | 2000-290967 A | 10/2000 |
| JP | 2002248304 A | 9/2002 |
| JP | 2005-095845 A | 4/2005 |
| JP | 2008006430 A | 1/2008 |
| JP | 2010-110662 A | 5/2010 |
| JP | 2012-091129 A | 5/2012 |
| KR | 10-0557985 B1 | 3/2006 |
| KR | 10-2011-0034076 A | 4/2011 |
| WO | 9117319 A1 | 11/1991 |
| WO | 0139863 A1 | 6/2001 |
| WO | 2014008511 A1 | 1/2014 |

OTHER PUBLICATIONS

European Patent Application No. 13813355, Supplementary European Search Report dated Apr. 18, 2016.
International Patent Application No. PCT/US2013/049604, International Preliminary Report on Patentability dated Jan. 15, 2015.
International Patent Application No. PCT/US2013/049604, International Search Report and Written Opinion dated Oct. 18, 2013.
International Patent Application No. PCT/US2015/031854, International Preliminary Report on Patentability dated Dec. 1, 2016.
International Patent Application No. PCT/US2015/031854, International Search Report dated Aug. 25, 2015.
European Patent Application No. 15796617.7, Supplementary European Search Report dated Jan. 17, 2018.
U.S. Appl. No. 14/412,625, Advisory Action dated Feb. 21, 2017.
U.S. Appl. No. 14/412,625, Notice of Allowance dated Dec. 12, 2017.
U.S. Appl. No. 14/412,625, Notice of Allowance dated Mar. 22, 2018.
U.S. Appl. No. 15/358,092, Non-Final Office Action dated Apr. 9, 2018.
Japanese Patent Application No. JP2016568580, Office Action dated Mar. 5, 2019—English Translation Available.
U.S. Appl. No. 15/358,092, Final Office Action dated Feb. 21, 2019.
European Patent Application No. EP15796617.7, Communication pursuant to Article 94(3) EPC dated May 23, 2019.
Japanese Patent Application No. JP2016568580, Office Action dated Jul. 2, 2019.
Korean Patent Application No. 10-2015-7003257, Office Action dated Aug. 26, 2019.
Canadian Patent Application No. 2,878,498, Office Action dated Nov. 26, 2019.
U.S. Appl. No. 15/358,092, Non-Final Office Action dated Jun. 7, 2019.
Japanese Patent Application No. 2016-568580, Office Action dated Jan. 7, 2020—English Translation Available.
U.S. Appl. No. 15/358,092, Final Office Action dated Jan. 30, 2020.
European Patent Application No. 15796617.7, Office Action dated May 15, 2020, 4 pages.
Korean Patent Application No. KR1020157003257, Notice of Allowance dated May 6, 2020, 7 pages.
U.S. Appl. No. 15/358,092, Non-Final Office Action dated May 20, 2020, 17 pages.

* cited by examiner

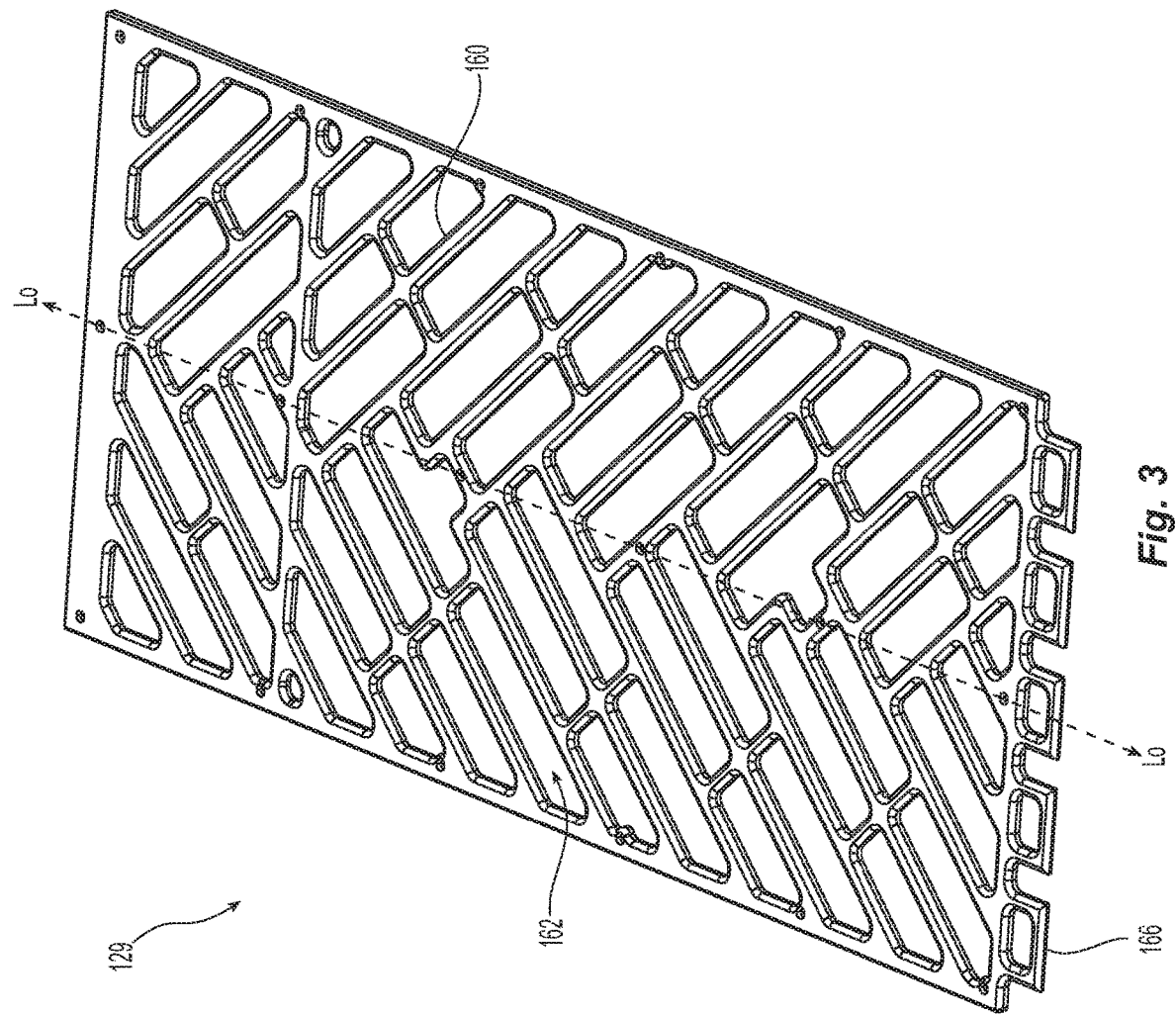

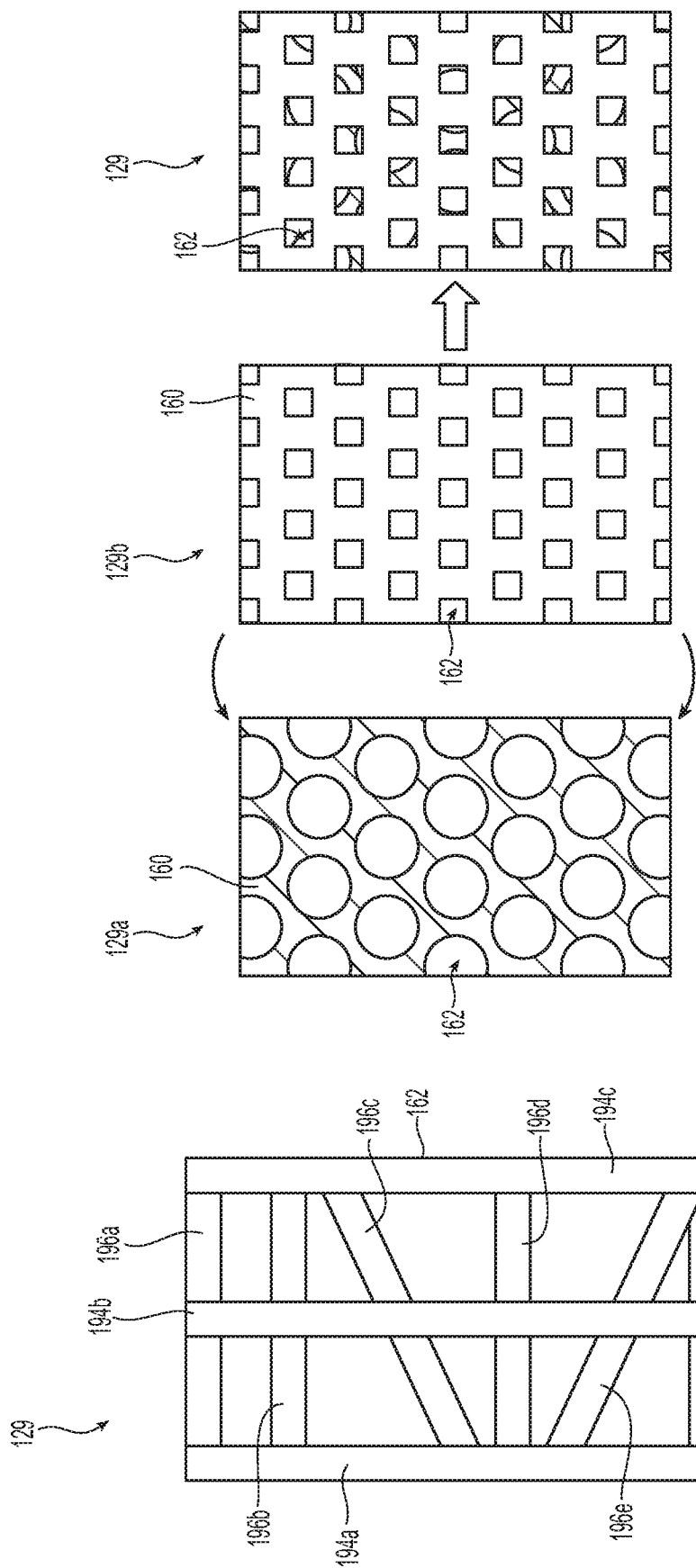

SUPPORT STRUCTURE FOR FLUID TREATMENT SYSTEMS HAVING BELTED FILTRATION SYSTEMS

CROSS-REFERENCE TO RELATED APPLICATION

The present application claims the benefit of U.S. Provisional Application No. 62/001,481, filed May 21, 2014, and is incorporated herein by reference in its entirety.

TECHNICAL FIELD

The present technology relates generally to fluid treatment systems. In particular, several embodiments are directed toward a fluid treatment system including a support structure for use in belted fluid filtration systems.

BACKGROUND

Purified water is used in many applications, including the chemical, power, medical and pharmaceutical industries, as well as for human consumption. Typically, prior to use, water is treated to reduce the level of contaminants to acceptable limits. Treatment techniques include physical processes such as filtration, sedimentation, and distillation; biological processes such as slow sand filters or activated sludge; chemical processes such as flocculation and chlorination; and the use of electromagnetic radiation such as ultraviolet light.

Physical filtration systems are used to separate solids from fluids by interposing a medium (e.g., a mesh or screen) through which only the fluid can pass. Undesirable particles larger than the openings in the mesh or screen are retained while the fluid is purified. In water treatment applications, for example, contaminants from wastewater such as storm water runoff, sediment, heavy metals, organic compounds, animal waste, and oil and grease must be sufficiently removed prior to reuse. Water purification plants and water purification systems often make use of numerous water filtration units for purification. It would be desirable to provide improved filtering units to reduce the expense and complexity of such purification systems.

BRIEF DESCRIPTION OF THE DRAWINGS

FIG. 3 is an isolated, top perspective view of a support configured in accordance with embodiments of the present technology.

FIGS. 5A-5H are top view of modular supports configured in accordance with embodiments of the present technology.

DETAILED DESCRIPTION

The present technology relates generally to treatment systems. In particular, several embodiments are directed toward fluid treatment systems including support members for rotating belt filters and associated systems and methods. In some embodiments, for example, the present technology includes a filter support having a longitudinal axis generally parallel to the direction of movement of the filter belt. The filter support can include a plurality of struts spaced apart by a plurality of openings, and at least one of the plurality of struts extends across a portion of the filter support such that a longitudinal axis of the at least one strut is positioned at an angle with respect to the longitudinal axis of the filter support.

Specific details of several embodiments of the technology are described below with reference to FIGS. 1A-5H. Other details describing well-known structures and systems often associated with fluid filtration systems have not been set forth in the following disclosure to avoid unnecessarily obscuring the description of the various embodiments of the technology. Many of the details, dimensions, angles, and other features shown in the Figures are merely illustrative of particular embodiments of the technology. Accordingly, other embodiments can have other details, dimensions, angles, and features without departing from the spirit or scope of the present technology. A person of ordinary skill in the art, therefore, will accordingly understand that the technology may have other embodiments with additional elements, or the technology may have other embodiments without several of the features shown and described below with reference to FIGS. 1A-5H.

Figure 1A:
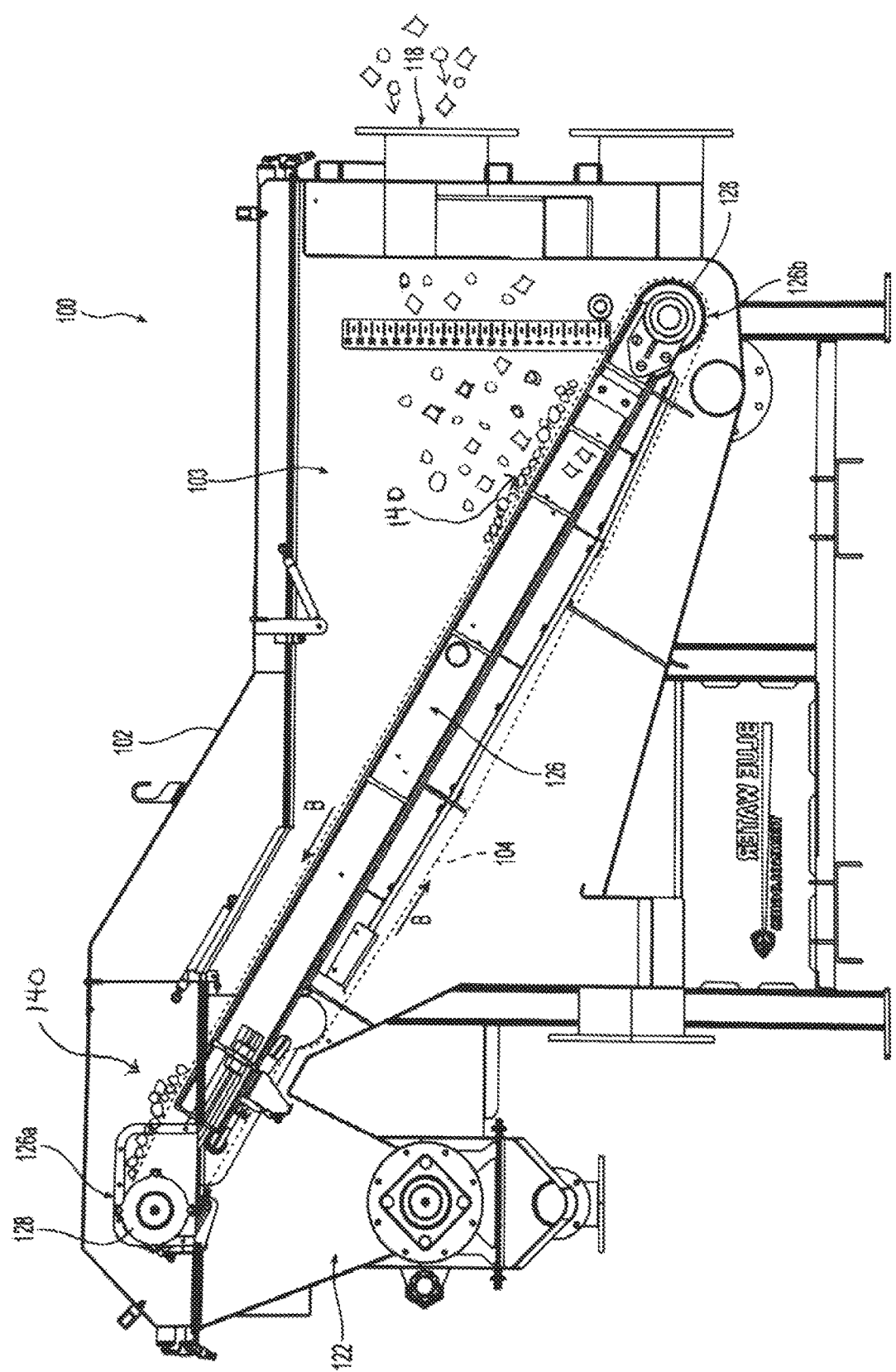
FIG. 1A is a front sectional view of a filtration system configured in accordance with embodiments of the present technology.
Figure 1B:
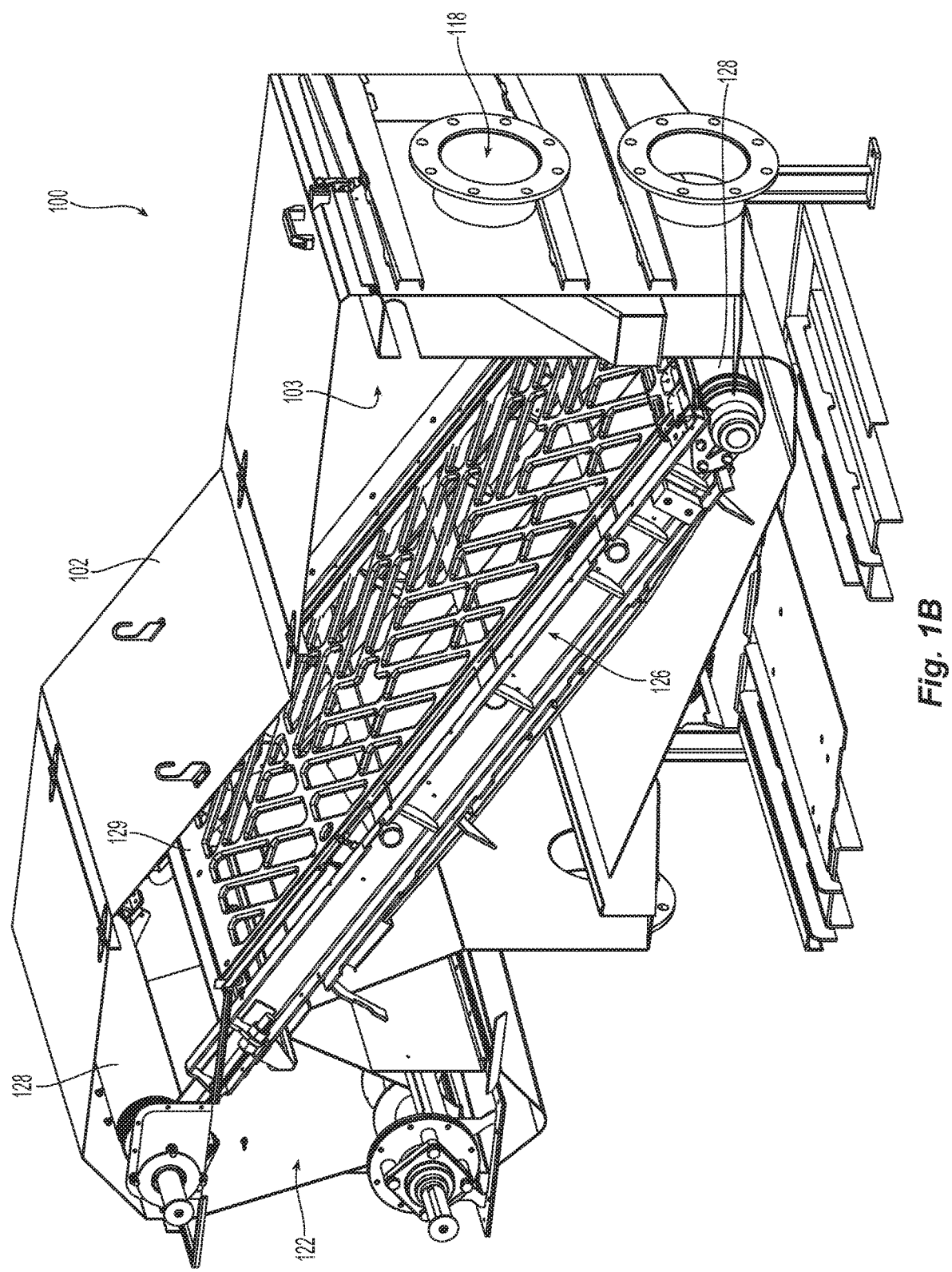
FIG. 1B is a perspective sectional view of the filtration system of FIG. 1A.

I. Overview of Rotating Belt Filtration Systems Configured for Use with the Filter Supports of the Present Technology FIG. 1A is a front sectional view of a treatment or filtration system 100 configured in accordance with embodiments of the present technology, and FIG. 1B is a perspective sectional view of the filtration system 100 of FIG. 1A. Referring to FIGS. 1A and 1B together, the filtration system 100 is configured to receive a fluid or influent (represented by a diamond symbol "0" in FIG. 1A) containing one or more constituents (represented by a circle symbol "0" in FIG. 1A) and separate the constituents from a majority of the fluid. The filtration system 100 can produce a large percentage of relatively clean effluent water and a small percentage of water concentrated with the constituents in a waste and/or recovery stream (e.g., an effluent), as described in greater detail below. As used herein, "constituents" refer to contaminants (e.g., scale, etc.) and/or commodities (e.g., dissolved solids, oils, paraffins, organics, metals, inorganic materials, etc.). For ease of reference, water containing such constituents is referred to herein as "contaminated water" even though the water may contain only commodities and no contaminants, only contaminants and no commodities, or both commodities and contaminants.

The system 100 includes a housing 102 that at least partially encloses and defines a fluid chamber 103 that receives the influent through an inlet 118 disposed on the housing 102. The filtration system 100 also includes a filter belt cartridge 126 positioned within the chamber 103. In some embodiments, the cartridge 126 can be configured to be received by a channel or other fluid pathway. The cartridge 126 can include a first end portion 126a, a second end portion 126b opposite the first end portion 126a, two rollers 128 positioned at the first and second end portions 126a, 126b, respectively, a filter belt 104 (not shown in FIG. 1B for ease of illustration) positioned around and between the rollers 128, and a filter support 129 positioned beneath at least a portion of the filter belt 104 and extending at least a portion of the distance between the rollers 128. The filter support 129 is described in greater detail below with reference to FIGS. 2-5H.

In some embodiments the cartridge 126 is fixed to a portion of the housing 102, and in other embodiments the cartridge 126 is removable from the chamber 103 and/or housing 102 for maintenance, replacement, or operational reduction/expandability. Although only a single cartridge 126 is shown in FIG. 1A, in other embodiments the system 100 can include more than one cartridge 126. For example, in some embodiments the chamber 103 can be divided into multiple compartments, each having its own cartridge 126. Examples of such filtration systems for use with the filter support 129 of the present technology are disclosed in U.S. patent application Ser. No. 14/412,625, filed Jan. 2, 2015, which is incorporated herein by reference in its entirety.

The filter belt 104 can be an integrated endless or looped filtering belt, such as a mesh configured to remove or reduce the level of suspended solids in the fluid. For example, the filter belt 104 can be porous such that the belt 104 prevents fluid and/or contaminants larger than the pore size of the filter belt 104 from passing through the filter belt 104. As such, the contaminants too large to pass through the filter belt 104 can build up on the filter belt's surface and form an accumulated solids layer 140 (only shown schematically in FIG. 1A). Although the accumulated solids layer 140 is shown as two, distinct spaced apart portions in FIG. 1A, this is for ease of illustration only. During a fluid treatment process, the accumulated solids layer 140 can extend across the entire length of the filter belt 104 and/or substantially cover the surface area of the filter belt 104 facing the chamber 103. The accumulated solids layer 140 can comprise a porous, at least partially solid layer formed by contaminants ranging in size. In operation, the gradient formed by the different-sized contaminants comprising the accumulated solids layer 140 can augment the filtering capabilities of the belt 104. The filter belt 104 can be configured to block contaminants such as stormwater runoff, algae, sediment, heavy metals, organic compounds, animal waste, and/or oil and grease. In alternative embodiments, the filter belt 104 and the accumulated solid layer 140 can be configured to block contaminants such as stormwater runoff, algae, sediment, heavy metals, organic compounds, animal waste, and/or oil and grease.

The system 100 can include one or more drive shafts, motors and/or gearboxes (not labeled) coupled to the rollers 128 and configured to rotate the rollers 128. The filter belt 104 is configured to pass over (e.g., rotate around) the rollers 128 in a direction indicated by arrows B As shown in FIGS. 1A and 1B, the cartridge 126 can be positioned at an incline (with respect to the ground) within the chamber 103 such that the first end portion 126a of the cartridge is positioned at an elevation greater than that of the second end portion 126b of the cartridge 126. As such, during operation of the system 100, the filter belt 104 carries the accumulated solid layer 140 upwards towards the first end portion 126a of the cartridge 126 and delivers at least a portion of the accumulated solid layer 140 to a solids collection system 122.

Figure 2:
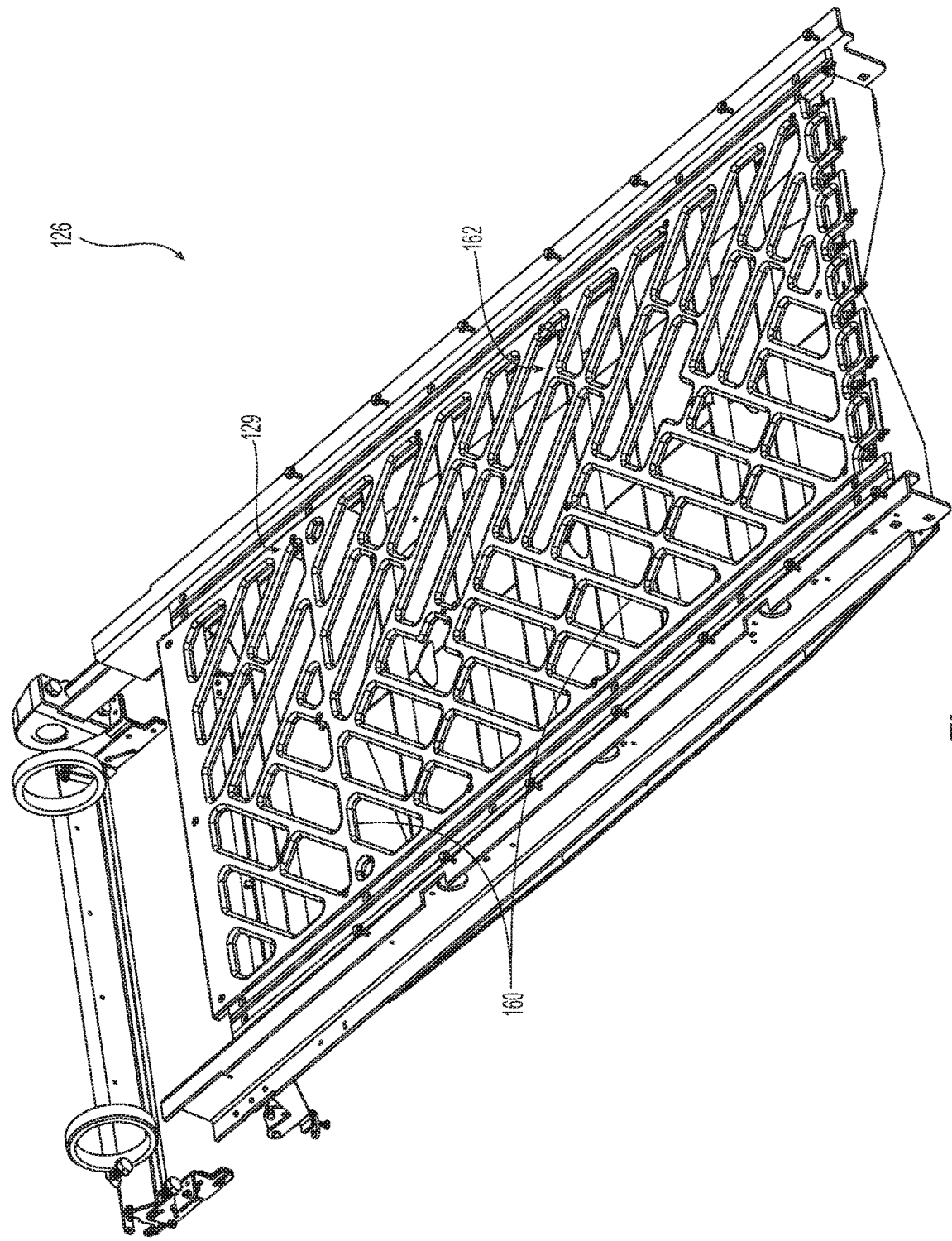
FIG. 2 is an isolated, side perspective view of a cartridge configured in accordance with embodiments of the present technology.

II. Selected Embodiments of Filter Supports For Use With Rotating Belt Filtration Systems FIGS. 2 and 3 are isolated views of the cartridge 126 and filter support 129, respectively, shown in FIGS. 1A and 1B. Referring to FIGS. 2 and 3 together, the filter support 129 is configured to be coupled to a frame of the cartridge 126 and/or other components of the filtration system 100. For example, in some embodiments the filter support 129 is fixed to the cartridge 126, and in other embodiments the filter support 129 can be positioned on the frame of the cartridge 126 and remain moveable with respect to the frame (as discussed in greater detail below with respect to FIG. 5F).

The filter support 129 of the present technology can include one or more struts 160 spaced apart by openings 162. In some embodiments, for example, the filter support 129 can be made of a single sheet of material (e.g., a metal, a plastic, a composite, etc.) and can be cut (e.g., laser cut) to form a strut configuration configured to improve exposed filter belt area and thus improve filtering efficiency. Various embodiments of strut configurations are discussed below with reference to FIGS. 4A-4D. In particular embodiments, the filter support 129 can be modular; that is, the filter support 129 can comprise two or more members having the same or different strut arrangement, as discussed in greater detail below with reference to FIGS. 5A-5H.

As best shown in FIG. 3, at least one of the struts 160 can be positioned such that a central longitudinal axis $S_a$ of the strut 160 makes a non-zero angle $\theta$ with respect to a longitudinal axis $L_o$ of the filter support 129. Such a strut is referred to herein as a "non-longitudinal strut" for ease of reference. Moreover, as used herein, "a longitudinal axis $L_o$ of the filter support 129" refers to any line passing through the body of the filter support 129 that runs parallel to the direction vector of the portion of the filter belt 104 immediately adjacent an upper surface of the filter support 129. In some embodiments, the angle $\theta$ is greater than or equal to 4 degrees (e.g., greater than or equal to 10 degrees, greater than or equal to 20 degrees, etc.).

The inclusion of non-longitudinal struts in the filter support 129 of the present technology provides several advantages over conventional filter belt supports. Conventional filter belt supports comprise a series of longitudinal struts spaced apart across the width of the belt. Because the conventional longitudinal struts run in the same direction the belt travels, the struts consistently block the portions of the filter aligned with the longitudinal struts, thus rendering those portions unusable for filtering. The strut arrangement of the present technology, however, staggers at least one of the support struts 160 along the direction vector of the filter belt 104 such that the angled, staggered struts do not consistently block or blind any portion of the filter belt 104 surface area, thereby increasing the exposed area of the filter belt 104. The strut configuration of the present technology provides an additional advantage in that it disperses the weight of the accumulated solid layer 140 across a greater portion of the width of the filter support 129 as compared to the longitudinal struts of conventional supports, thereby reducing stress on the belt and leading to longer belt life. Filter belts on conventional supports have consistently unsupported portions between the longitudinal struts which causes those portions to stretch and bend under the weight of the accumulated solid layer.

Figure 4D:
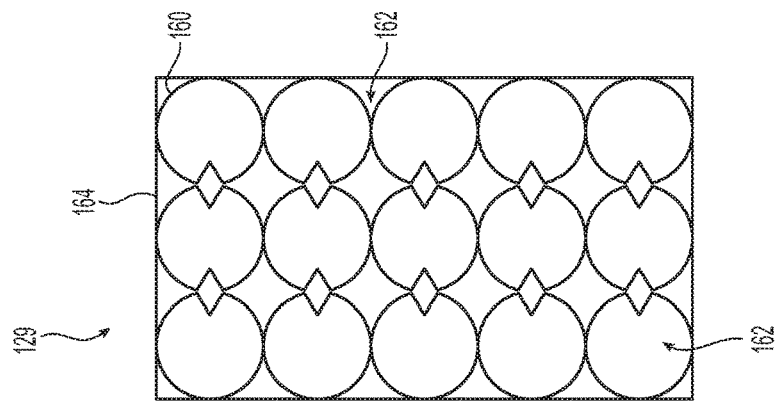
FIGS. 4A-4D are top views of supports having various strut patterns configured in accordance with several embodiments of the present technology.
Figure 4C:
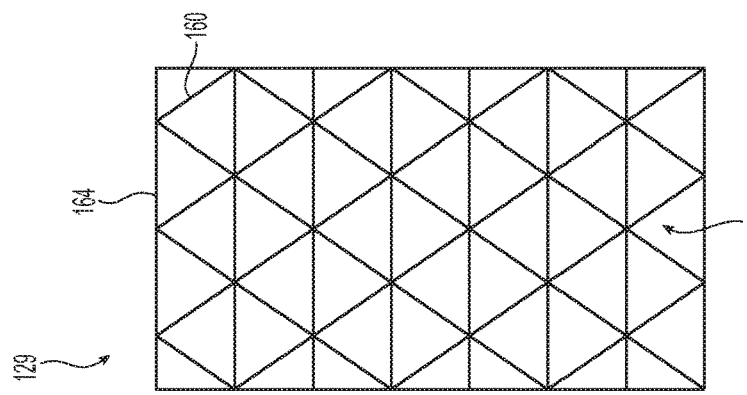
Figure 4B:
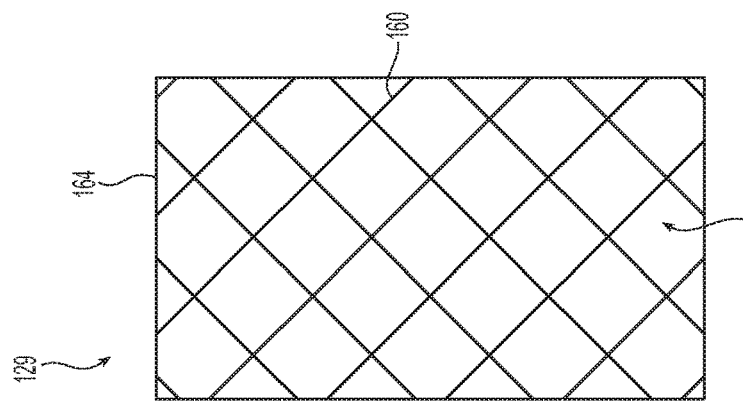
Figure 4A:
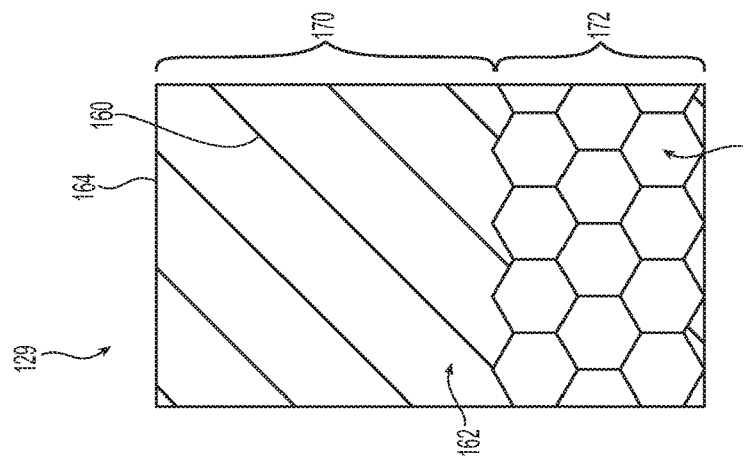

The struts 160 of the embodiment shown in FIG. 3 are arranged in a generally chevron pattern. It will be appreciated that the filter support 129 of the present technology can have any composition and/or arrangement of struts that includes at least one non-longitudinal strut. In some embodiments, for example, all of the struts 160 can be non-longitudinal struts. FIGS. 4A-4D illustrate several examples of strut arrangements configured in accordance with the present technology. As shown in FIG. 4A, in some embodiments the filter support 129 can include a first portion 170 having a first arrangement of struts 160 and a second portion 172 having a second arrangement of struts 160. The struts 160 can be arranged in a honeycomb pattern (FIG. 4A), a diamond pattern (FIG. 4B), a triangle pattern (FIG. 4C), or any other suitable geometric pattern. In a particular embodiment, the struts 160 are not arranged in any pattern. Additionally, the non-longitudinal struts (and/or portions thereof) can be linear (FIGS. 4A-4C), curved (FIG. 4D), or both (FIG. 4D).

Figure 5C:
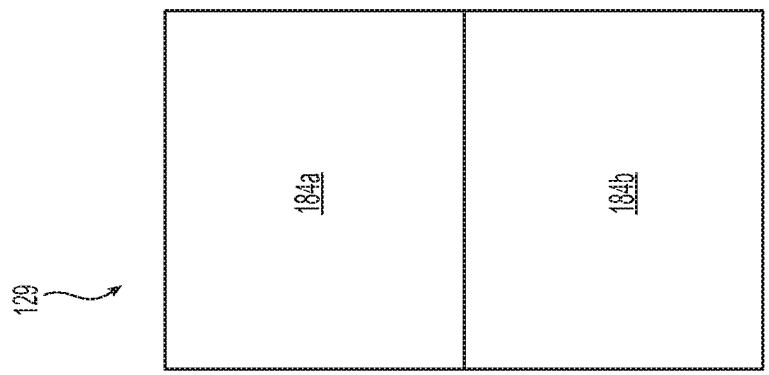
Figure 5B:
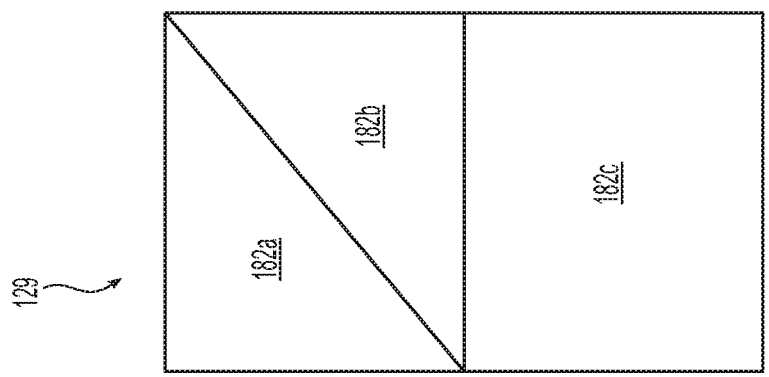
Figure 5A:
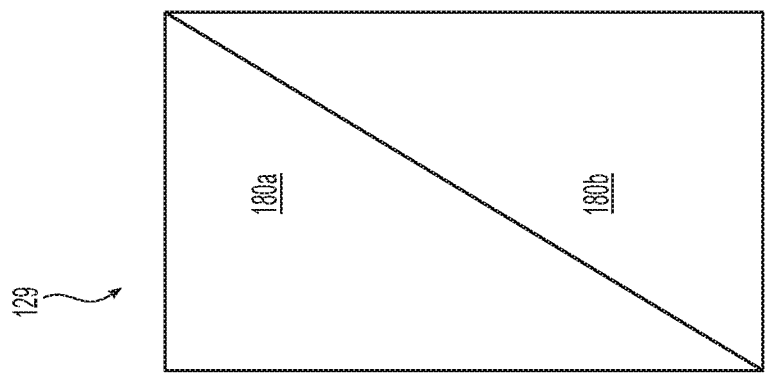
Figure 5F:
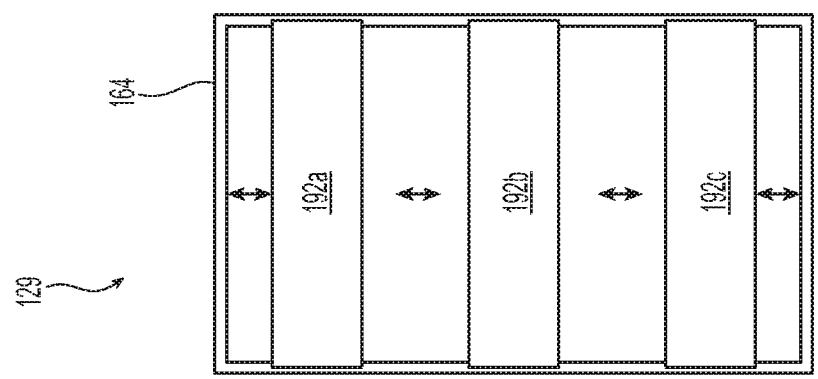
Figure 5E:
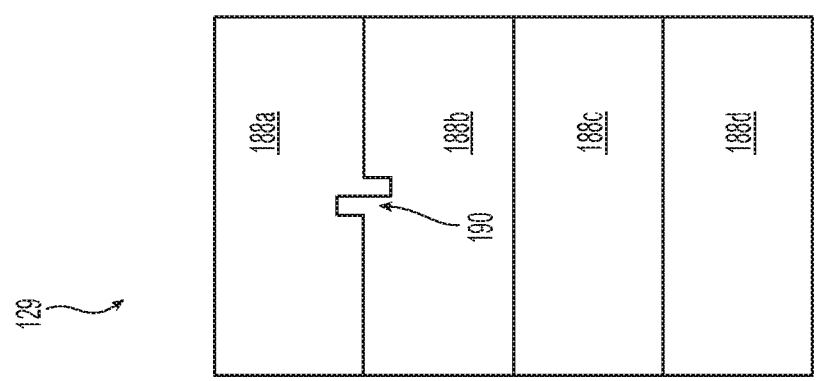
Figure 5D:
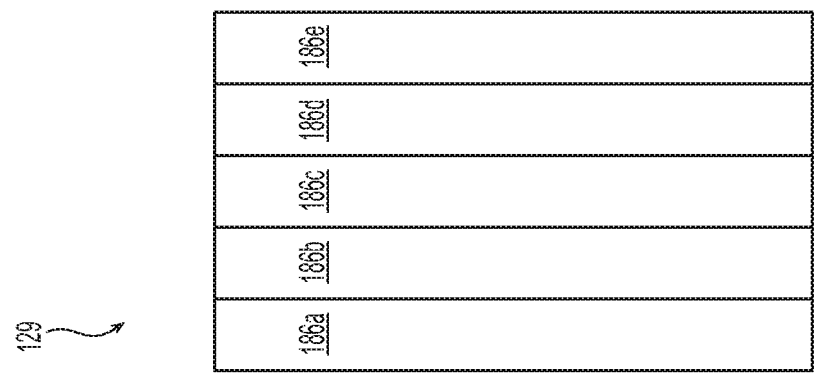

In some embodiments, the filter support 129 can be modular and/or be comprised of two or more distinct members. FIGS. 5A-5H illustrate several embodiments of modular filter supports 129. FIG. 5A shows a modular filter support 129 having a first member 180a and a second member 180b. As shown in FIG. 5B, different members within the same filter support 129 can have different shapes, different sizes, and different orientations with respect to the other members. The members can be positioned edge-to-edge along the length of the filter support 129, as shown in FIG. 5C, and/or can be positioned edge-to-edge along the width of the filter support 129, as shown in FIG. 5D. FIG. 5E shows one example of a filter support 129 have interlocking members. In some embodiments, the members can be spaced apart along a frame 164 (and/or the cartridge frame), as shown in FIG. 5F. The spaced-apart members can be fixed in place and/or can be moveable relative to the frame 164 (and/or cartridge 126). Additionally, the members can be stacked or layered. For example, as shown in FIG. 5G, the filter support 129 can have one or more struts 196 arranged at a first elevation and one or more struts 194 arranged at a second elevation greater than the first elevation. As shown in FIG. 5H, in some embodiments the filter support 129 can comprise a first filter support 129a and a second support 129b overlaid on the first filter support 129a. The first and second filter supports 129a, 129b can have different strut arrangements and/or similar strut arrangements offset from one another.

From the foregoing, it will be appreciated that specific embodiments of the technology have been described herein for purposes of illustration, but that various modifications may be made without deviating from the disclosure. For example, while various attributes of the fluid flow or the filtering apparatus are designated as "upper", "lower", "left", "right", "upwardly-facing", "downward", etc., these terms are used only for purposes of explaining the accompanying drawings. For example, in some embodiments, an inlet may be at a lower height than an outlet and/or fluids may be filtered upwards through a filter mesh such that gravity assists in keeping contaminants from piercing an overhead filter. In still further embodiments, the filtration systems may include additional features, such as overflow chambers, fluid routing systems, or additional flow paths. Additionally, while advantages associated with certain embodiments of the new technology have been described in the context of those embodiments, other embodiments may also exhibit such advantages, and not all embodiments need necessarily exhibit such advantages to fall within the scope of the technology. Accordingly, the disclosure and associated technology can encompass other embodiments not expressly shown or described herein. Thus, the disclosure is not limited except as by the appended claims.

We claim:

1. A device comprising:
a filter support configured to be positioned adjacent a filter belt within a filter belt filtration system, the filter support having a longitudinal axis generally parallel to the direction of movement of the filter belt, wherein the filter support includes:
a first plurality of struts spaced apart by a plurality of first spacings, wherein the first plurality of struts extend across a first portion of the support such that longitudinal axes of the first plurality of struts are positioned at an angle of at least 10 degrees with respect to the longitudinal axis of the filter support;
a second plurality of struts spaced apart by a plurality of second spacings, wherein the second plurality of struts extend across a second portion of the support such that the longitudinal axes of the second plurality of struts are positioned at an angle of at least 10 degrees with respect to the longitudinal axis of the filter support; and,
wherein the first plurality of struts include struts on a first side of a centerline of the support that extend from a first edge on the first side to the centerline and shorter struts on a second side of the centerline opposite the first side that extend only between struts of the second plurality of struts,
wherein the second plurality of struts include struts on the second side that extend from the second edge to the centerline and shorter struts on the first side that extend only between struts of the first plurality of struts, and
wherein the filter support is made of a single sheet of material, the openings are cutouts in the sheet of material, and the struts are portions of the sheet of material.

2. The device of claim 1 wherein the filter support includes at least one longitudinal strut that runs parallel to the longitudinal axis of the filter support.

3. A treatment system, comprising:
a chamber configured to receive a fluid;
a cartridge positioned within the chamber, wherein the cartridge includes:
a frame;
a set of rollers;
a filter belt positioned around and between the rollers;
a filter support positioned on the frame, the filter support comprising:
a first plurality of struts spaced apart by a plurality of first spacings, wherein the first plurality of struts extend across a first portion of the support such that longitudinal axes of the first plurality of struts are positioned at an angle of at least 10 degrees with respect to the longitudinal axis of the filter support;
a second plurality of struts spaced apart by a plurality of second spacings, wherein the second plurality of struts extend across a second portion of the support such that the longitudinal axes of the second plurality of struts are positioned at an angle of at least 10 degrees with respect to the longitudinal axis of the filter support; and,
wherein the first plurality of struts include struts on a first side of a centerline of the support that extend from a first edge on the first side to the centerline and shorter struts on a second side of the centerline opposite the first side that extend only between struts of the second plurality of struts,
wherein the second plurality of struts include struts on the second side that extend from the second edge to the centerline and shorter struts on the first side that extend only between struts of the first plurality of struts, and wherein the filter support is made of a single sheet of material, the openings are cutouts in the sheet of material, and the struts are portions of the sheet of material.

4. The system of claim 3 wherein the filter support includes at least one longitudinal strut that runs parallel to the longitudinal axis of the filter support.

5. The system of claim 3 wherein at least one of the plurality of first struts and the plurality of second struts are arranged in a chevron configuration.

* * * * *